US008583436B2

(12) United States Patent
Yamamoto et al.

(10) Patent No.: US 8,583,436 B2
(45) Date of Patent: Nov. 12, 2013

(54) WORD CATEGORY ESTIMATION APPARATUS, WORD CATEGORY ESTIMATION METHOD, SPEECH RECOGNITION APPARATUS, SPEECH RECOGNITION METHOD, PROGRAM, AND RECORDING MEDIUM

(75) Inventors: Hitoshi Yamamoto, Tokyo (JP); Kiyokazu Miki, Tokyo (JP)

(73) Assignee: NEC Corporation, Tokyo (JP)

( * ) Notice: Subject to any disclaimer, the term of this patent is extended or adjusted under 35 U.S.C. 154(b) by 409 days.

(21) Appl. No.: 12/809,199

(22) PCT Filed: Dec. 19, 2008

(86) PCT No.: PCT/JP2008/073192
§ 371 (c)(1),
(2), (4) Date: Jun. 18, 2010

(87) PCT Pub. No.: WO2009/081861
PCT Pub. Date: Jul. 2, 2009

(65) Prior Publication Data
US 2011/0173000 A1    Jul. 14, 2011

(30) Foreign Application Priority Data

Dec. 21, 2007  (JP) ................. 2007-330154

(51) Int. Cl.
*G06F 17/27* (2006.01)
*G10L 15/00* (2013.01)
*G10L 15/04* (2013.01)
*G10L 15/18* (2013.01)
*H04M 1/64* (2006.01)

(52) U.S. Cl.
USPC ............. 704/257; 704/9; 704/231; 704/236; 704/239; 704/240; 704/243; 704/251; 704/252; 704/254; 704/255; 379/88.01

(58) Field of Classification Search
USPC ...................... 704/231, 251–257, 9
See application file for complete search history.

(56) References Cited

U.S. PATENT DOCUMENTS 5,613,036 A  *  3/1997  Strong ..................... 704/243
7,103,542 B2 *  9/2006  Doyle ...................... 704/231
(Continued)

FOREIGN PATENT DOCUMENTS

JP          6-19959 A      1/1994
JP       2001318792 A     11/2001
(Continued)

OTHER PUBLICATIONS

Nguyen, Minh et al. "A structured SVM semantic parser augmented by semantic tagging with conditional random field". Institute of Linguistics, Academia Sinica, The 19th Pacific Asia Conference on Langauge, Information and Computation, 2005.*

(Continued)

*Primary Examiner* — Paras D Shah

(57) ABSTRACT

A word category estimation apparatus (100) includes a word category model (5) which is formed from a probability model having a plurality of kinds of information about a word category as features, and includes information about an entire word category graph as at least one of the features. A word category estimation unit (4) receives the word category graph of a speech recognition hypothesis to be processed, computes scores by referring to the word category model for respective arcs that form the word category graph, and outputs a word category sequence candidate based on the scores.

12 Claims, 7 Drawing Sheets

(56) References Cited

U.S. PATENT DOCUMENTS

| | | | |
|---|---|---|---|
| 7,302,383 B2 * | 11/2007 | Valles | 704/9 |
| 7,333,928 B2 * | 2/2008 | Wang et al. | 704/9 |
| 7,415,406 B2 * | 8/2008 | Huang et al. | 704/9 |
| 7,584,189 B2 * | 9/2009 | Murakami et al. | 1/1 |
| 7,587,308 B2 * | 9/2009 | Kasravi et al. | 704/9 |
| 7,587,322 B2 * | 9/2009 | Schimmer et al. | 704/257 |
| 7,747,443 B2 * | 6/2010 | Ichikawa et al. | 704/270 |
| 8,301,450 B2 * | 10/2012 | Lee et al. | 704/257 |
| 2002/0026307 A1 * | 2/2002 | Ruland | 704/9 |
| 2005/0080632 A1 * | 4/2005 | Endo et al. | 704/277 |
| 2005/0182628 A1 * | 8/2005 | Choi | 704/252 |
| 2007/0100618 A1 * | 5/2007 | Lee et al. | 704/238 |
| 2008/0071536 A1 * | 3/2008 | Nagashima | 704/246 |
| 2008/0177541 A1 * | 7/2008 | Satomura | 704/251 |
| 2008/0221891 A1 * | 9/2008 | Konig et al. | 704/252 |

FOREIGN PATENT DOCUMENTS

| | | |
|---|---|---|
| JP | 2004094434 A | 3/2004 |
| JP | 2004184951 A | 7/2004 |

OTHER PUBLICATIONS

International Search Report for PCT/JP2008/073192 mailed Mar. 24, 2009.

K. Sudoh et al., "Incorporating Speech Recognition Confidence into Discriminative Models for Named Entity Recognition of Speech", Proceedings of 1st Spoken Document Processing Workshop, Media Science Research Center in Toyohashi University of Technology, Japan, 2007.

D. M. Bikel et al., "An Algorithm that Learns What's in a Name", Kluwer Academic Publishers, Machine Learning 34, 1999, pp. 211-231.

T. Kudo et al., "Applying Conditional Random Fields to Japanese Morphologiaical Analysis", IPSJ SIG TEchnical Report, 2004-NL-161 (13), vol. 2004, No. 47, May 14, 2004, pp. 89-96.

M. Asahara et al., "Extended Models and Tools for High-performance Part-of-speech Tagger", Proceedings of the 18th International Conference on Computational Linguistics, 2000, pp. 21-27.

* cited by examiner

FIG. 3
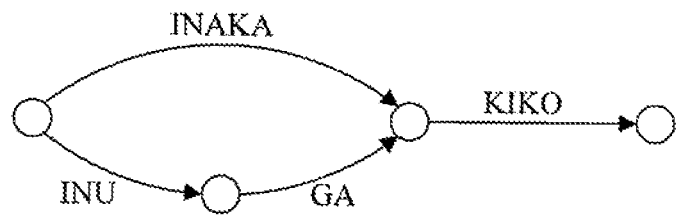
FIG. 4
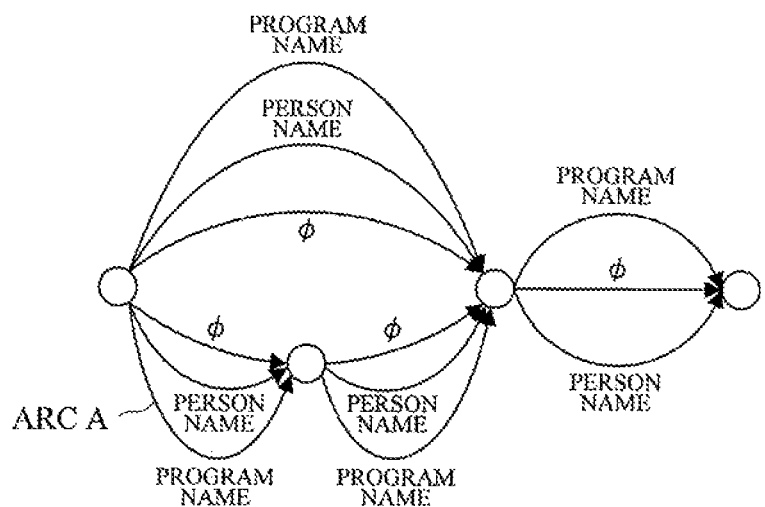
FIG. 5
```
PART OF SPEECH    : NOUN
CONFIDENCE SCORE  : 0.4
POSITION          : FIRST HALF
COOCCURRENCE      : APPEAR
        ⋮
``` f (PART OF SPEECH = NOUN) : 1
f (RELIABILITY) : 0.4
f (POSITION = FIRST HALF) : 1
f (COOCCURRENCE = APPEAR) : 1

⋮

WORD CATEGORY ESTIMATION APPARATUS, WORD CATEGORY ESTIMATION METHOD, SPEECH RECOGNITION APPARATUS, SPEECH RECOGNITION METHOD, PROGRAM, AND RECORDING MEDIUM

The present application is the National Phase of PCT/JP2008/073192, filed Dec. 19, 2008, which claims priority based on Japanese patent application No. 2007-330154 filed on Dec. 21, 2007.

TECHNICAL FIELD

The present invention relates to a speech recognition technique of converting speech into electronic data such as text data and, more particularly, to a technique of estimating the category of a phrase being uttered.

BACKGROUND ART

It is important for an information retrieval apparatus which receives the recognition result of speech (utterance) uttered by a user to correctly recognize a phrase (keyword) effective for narrowing down information which matches his intension. For example, an apparatus which searches for a television program narrows down programs using the program name, cast name, or the like as keywords. If the apparatus mistakes a keyword contained in user's utterance, it may provide, as a search result, a program different from one the user wants to view, because programs are narrowed down based on the wrong phrase.

One method for recognizing a keyword at high accuracy uses the type of a keyword contained in an utterance as a language restriction. There has conventionally been proposed a method of automatically extracting a named entity from a speech recognition result in order to identify the type of a keyword contained in an utterance. A technique concerning this method is described in, for example, reference 1 "Japanese Patent Laid-Open No. 2004-184951".

The technique described in reference 1 is a named entity class identification method using a language model learned using a text with a named entity class. As shown in FIG. 11, a named entity class identification apparatus according to this technique generates a word graph with a named entity class from a speech recognition result. By using a morphological language model with a named entity class, the named entity class identification apparatus outputs a morpheme sequence with a named entity class that maximizes the total probability.

There is also a method of suppressing a decrease in extraction accuracy caused by the influence of a speech recognition error when extracting a named entity contained in a speech recognition result. For example, the speech recognition confidence is used as the feature of a discriminative model for extracting a named entity in reference 2 "Sudoh et al., 'Incorporating Speech Recognition Confidence into Discriminative Models for Named Entity Recognition of Speech', Proceedings of 1st Spoken Document Processing Workshop, Media Science Research Center in Toyohashi University of Technology, Japan, 2007".

DISCLOSURE OF INVENTION

Problems to be Solved by the Invention

However, the use of the named entity class identification method described in reference 1 may not achieve an accuracy enough to identify a named entity contained in an utterance. This is because only the bigram of words with a named entity class is used as a scale for estimating a named entity class. This method considers only some of features useful for discriminating a named entity.

In this method, both the named entity class and word are simultaneously identified. If a speech recognition error occurs, the language model needs to contain a word suffering the error. However, there are too many parameters to be learned, compared to a language model of only words. It is difficult to learn such a language model at high accuracy. This leads to a failure to detect a named entity contained in an utterance, and a detection error of a named entity of a kind which does not match the contents of the entire utterance.

The method described in reference 2 employs, as features of a discriminative model, various kinds of features for discriminating a named entity. This method can increase the named entity extraction accuracy in comparison with the method described in reference 1.

However, this method uses only limited features, i.e., those of two words preceding and succeeding each word. It is difficult to extract a named entity in a section in which speech recognition errors continue for several words.

The present invention has been made to solve the above problems, and has as its object to provide a word category estimation apparatus, word category estimation method, speech recognition apparatus, speech recognition method, program, and recording medium capable of increasing the robustness against a speech recognition error and the estimation accuracy when estimating the category of a phrase being uttered.

Means of Solution to the Problems

To achieve the above object, a word category estimation apparatus according to the present invention comprises a word category model which is formed from a probability model having a plurality of kinds of information about a word category as features, and includes information about an entire word category graph as at least one of the features, and a word category estimation unit which receives a word category graph of a speech recognition hypothesis to be processed, computes scores by referring to the word category model for respective arcs that form the word category graph, and outputs a word category sequence candidate based on the scores.

A word category estimation method according to the present invention comprises the step of storing, in a storage unit, a word category model which is formed from a probability model having a plurality of kinds of information about a word category as features, and includes information about an entire word category graph as at least one of the features, and the word category estimation step of causing an arithmetic processing unit to receive a word category graph of a speech recognition hypothesis to be processed, compute scores by referring to the word category model for respective arcs that form the word category graph, and output a word category sequence candidate based on the scores.

A speech recognition apparatus according to the present invention comprises a speech recognition unit which generates a speech recognition hypothesis corresponding to input speech, a word category model which is formed from a probability model having a plurality of kinds of information about a word category as features, and includes information about an entire word category graph as at least one of the features, a word category estimation unit which receives a word category graph of the speech recognition hypothesis, computes scores by referring to the word category model for respective arcs that form the word category graph, and estimates a word category based on the scores, and a speech re-recognition unit which performs speech recognition again using a result of the word category estimation as a vocabulary restriction.

A speech recognition method according to the present invention comprises the speech recognition step of causing an arithmetic processing unit to generate a speech recognition hypothesis corresponding to input speech, the step of storing, in a storage unit, a word category model which is formed from a probability model having a plurality of kinds of information about a word category as features, and includes information about an entire word category graph as at least one of the features, the word category estimation step of causing the arithmetic processing unit to receive a word category graph of the speech recognition hypothesis, compute scores by referring to the word category model for respective arcs that form the word category graph, and estimate a word category based on the scores, and the speech re-recognition step of causing the arithmetic processing unit to perform speech recognition again using a result of the word category estimation as a vocabulary restriction.

Effects of the Invention

The present invention can increase the robustness against a speech recognition error and the estimation accuracy when estimating the category of a phrase being uttered.

BRIEF DESCRIPTION OF DRAWINGS

FIG. 3 exemplifies a word graph;
FIG. 4 exemplifies a word category graph;
FIG. 5 exemplifies features concerning a word category.

BEST MODE FOR CARRYING OUT THE INVENTION

Preferred exemplary embodiments of the present invention will now be described with reference to the accompanying drawings.

[First Exemplary Embodiment]

Figure 1:
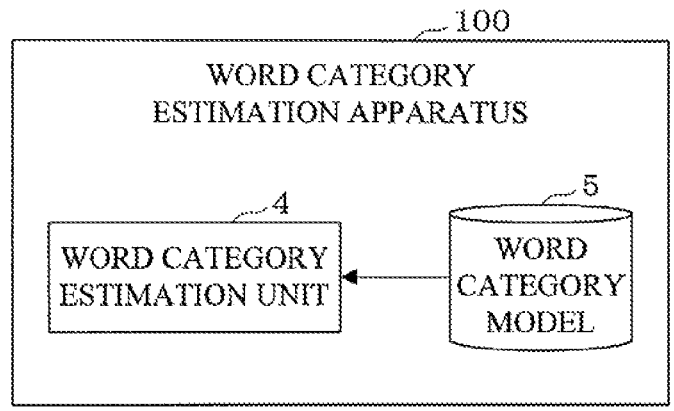
FIG. 1 is a block diagram showing the arrangement of a word category estimation apparatus according to the first exemplary embodiment of the present invention.

The basic arrangement of a word category estimation apparatus according to the first exemplary embodiment of the present invention will be described with reference to FIG. 1.

A word category estimation apparatus 100 according to the first exemplary embodiment is formed as a whole from an information processing apparatus such as a PC terminal or server apparatus in which a computer processes input data. The word category estimation apparatus 100 acquires a speech recognition hypothesis output from a speech recognition apparatus or the like, and estimates the category of each word contained in the speech recognition hypothesis.

The word category estimation apparatus 100 includes a word category estimation unit 4 and word category model 5 as main basic building components.

The word category model 5 is formed from a probability model having a plurality of kinds of information about the word category as features. The word category model 5 includes information about an entire word category graph as at least one feature.

The word category estimation unit 4 receives the word category graph of a speech recognition hypothesis to be processed. By referring to the word category model, the word category estimation unit 4 computes scores for respective arcs which form the word category graph, and outputs a word category sequence candidate based on the scores.

A word category estimation apparatus according to the first exemplary embodiment of the present invention will be explained in detail with reference to FIG. 2.

A word category estimation apparatus 101 includes, as main components, a speech recognition hypothesis input unit 2, a word category graph generation unit 3, the word category estimation unit 4, and the word category model 5.

Of these building components, the speech recognition hypothesis input unit 2, word category graph generation unit 3, and word category estimation unit 4 are building components corresponding to a program executed by the CPU (not shown) of the word category estimation apparatus 101. The word category model 5 is data stored in the storage device (not shown) of the word category estimation apparatus 101.

The building components of the word category estimation apparatus 101 are implemented by an arbitrary combination of hardware and software mainly including the CPU and memory of an arbitrary computer, a program loaded into the memory to provide each building component, a storage unit such as a hard disk which stores the program, and a network connection interface. Various modifications of the implementation method and apparatus will readily occur to those skilled in the art. Each drawing to be described below shows not hardware blocks but functional blocks.

The speech recognition hypothesis input unit 2 receives a speech recognition hypothesis output from an external speech recognition apparatus (not shown), and provides it to the word category graph generation unit 3. The speech recognition hypothesis is information generated by performing speech recognition processing by the speech recognition apparatus to recognize a word sequence from speech. The speech recognition hypothesis is, for example, a word graph which is information indicating a plurality of word sequences, or an N-best word sequence (sequence of N best words).

The word category graph generation unit 3 receives the speech recognition hypothesis output from the speech recognition hypothesis input unit 2, generates a word category graph, and provides it to the word category estimation unit 4. The word category represents the semantic type of a word, such as person, location, time, or numeric expression, and is set in accordance with the application purpose. For example, for an application purpose of searching for a television program, the word categories are the person name (e.g., personality name or group name), program name, program genre (e.g., variety show or sports), broadcasting station name, and time (e.g., evening or 8 o'clock).

In one exemplary embodiment, the word category graph takes a network form similarly to the word graph of a speech recognition hypothesis. The label of each arc is expressed not by a word but by a word category. The word category graph can be generated by replacing each arc of the word graph of a speech recognition hypothesis with a predetermined word category. This processing may also be done for a graph obtained by clustering the arcs of the word graph of a speech recognition hypothesis, based on the word similarity or the like.

FIG. 3 shows part of the word graph (representing that there are two candidates "inaka kiko" and "inu ga kiko". FIG. 4 shows a word category graph generated by expanding each arc into three categories "person name", "program name", and "φ (other)".

The word category estimation unit 4 receives a word category graph from the word category graph generation unit 3, searches the word category graph by referring to the word category model 5, and outputs an optimum word category sequence based on a predetermined criterion. In one exemplary embodiment, the word category estimation unit 4 includes a path search unit 41 and score computation unit 42.

The path search unit 41 outputs word category sequences (paths) expressed by an input word category graph after ordering them based on a predetermined criterion such as the magnitude of the word category occurrence score. The path search unit 41 acquires the word category occurrence score of each arc from the score computation unit 42, and accumulates scores for each path. In one exemplary embodiment, a highly ranked path can be obtained by A* search. This processing can be made more efficient by pruning or the like. When word category sequences of the same word category continue, post-processing can also be applied to combine them and output the combined word category sequence.

Every time the path search unit 41 refers to each arc of the word category graph, the score computation unit 42 extracts a feature concerning the arc. By referring to the word category model 5, the score computation unit 42 computes the score of the arc and provides it to the path search unit 41. In one exemplary embodiment, the score of the word category can be given by the conditional probability p(c|f) of the word category (c) conditioned on the feature (f).

The word category model 5 stores the relationship between the feature of the word category and the occurrence frequency of the word category in the form of a probability model or rule. For example, in the use of CRF (Conditional Random Fields) which is a kind of discriminative model, the weight value of each feature for each word category is expressed as a parameter of the model.

A word model 51 stores the relationship between the feature of each arc and the occurrence frequency of the word category. Examples of the feature are linguistic features (e.g., surface (notation), reading (pronunciation), and part of speech) of an original word corresponding to the arc, and features of the recognition result (e.g., confidence score and errata). As a feature of the arc, a combination of the features of arcs preceding and succeeding the arc, and those of an arc opposed to it is usable.

An utterance model 52 stores the relationship between the feature of the whole word category graph (whole utterance) and the occurrence frequency of the word category. Examples of the feature of the whole word category graph are position information in the word category graph (e.g., first half, second half, or Nth from the start), information about the structure of the word category graph (e.g., the number of arcs or the average number of branches), a combination of words contained in the word category graph (e.g., cooccurrence information of a plurality of words), and bigram information of the word category.

In one exemplary embodiment, CRF (Conditional Random Fields), which is a kind of discriminative model, can be used as the word category model 5. At this time, the word category model 5 can be defined by mathematical 1:

$$P(y\mid x) = \frac{1}{Z_x}\exp(\Lambda\cdot\Phi(y,x)) \quad\text{[Mathematical 1]}$$

In mathematical 1, "x" is an input subjected to category estimation processing, and "y" is a category serving as a discrimination result. "Φ(y,x)" is information indicating the feature of the processing target "x", and "Λ" is a CRF model parameter (weight value) corresponding to each feature. "Zx" is a normalization term. "exp( )" is a function of calculating the exponentiation of a numeral with a base of e.

For the word category model 5 of this exemplary embodiment, the feature Φ and model parameter Λ (weight value) are stored in the storage device.

A method of estimating a category represented by each word of a speech recognition hypothesis (category to which each word belongs) by the word category estimation unit 4 when the speech recognition hypothesis is a word graph and CRF is employed as the word category model 5 will be exemplified.

The word category estimation unit 4 receives a word category graph input from the word category graph generation unit 3. FIG. 4 exemplifies the word category graph.

By search using the Viterbi algorithm, the word category estimation unit 4 specifies a path which maximizes the left-hand side P(y|x) of mathematical 1. Also, the word category estimation unit 4 specifies a highly ranked path by A* search.

The score at each arc contained in the word category graph is the product of a feature concerning each arc and a weight value serving as a CRF model parameter for each feature.

Figures 6, 7:
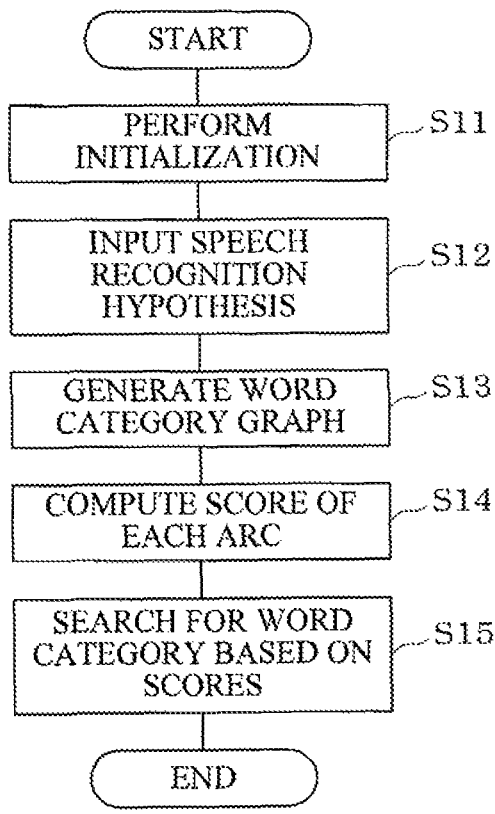
FIG. 6 exemplifies the features of a word category model.
FIG. 7 is a flowchart showing word category estimation processing by the word category estimation apparatus according to the first exemplary embodiment of the present invention.

A method of calculating a score at arc A will be explained by exemplifying arc A contained in the word category graph of FIG. 4. FIG. 5 exemplifies features concerning arc A. FIG. 6 exemplifies the representation of the features in FIG. 5 as features of the word category model. Assume that arc A has features such as "part of speech=noun, recognition confidence score=0.4, position=first half, cooccurrence=appear" as shown in FIG. 5. As the CRF features (Φ), these features can be represented as shown in FIG. 6. The score of arc A is obtained by multiplying the values of these features and the weight (Λ) of the word category "program name" corresponding to arc A among model parameters. A higher score means higher uniqueness of the word category.

At this time, the word model 51 holds the features "part of speech (part of speech of the word corresponding to arc A)" and "recognition confidence score (recognition confidence score of the word corresponding to arc A)". The utterance model 52 holds the features "position (position of arc A in the word category graph)" and "cooccurrence (word which cooccurs together with the word corresponding to arc A in the word category graph)". The use of CRF allows simultaneously handling the features in the word model 51 and utterance model 52, and obtaining the score of the word category on the same criterion.

The CRF model parameter may also be optimized (learned) by iterative calculation or the like according to a criterion for maximizing the log-likelihood in mathematic 1 using, as learning data, a pair of an input (x: speech recognition hypothesis) and an output (y: word category) which are made to correspond to each other in advance.

Note that details of the discrimination method and model parameter learning method using CRF are described in, for example, reference 3 "J. Lafferty, A. McCallum, F. Pereira, 'Conditional Random Fields: Probabilistic Models for Segmenting and Labeling Sequence Data', Proceedings of 18th International Conference of Machine Learning, 2001, pp. 282-289".

As described above, CRF is advantageous for discrimination of the word category. This is because there are known a graph search algorithm corresponding to the word category estimation unit 4 and a model parameter learning algorithm when a graph is used as learning data. In addition, multiple classes can be discriminated using one model.

[Operation in First Exemplary Embodiment]

The operation of the word category estimation apparatus according to the first exemplary embodiment of the present invention will be explained with reference to FIG. 7.

After activation, the word category estimation apparatus 101 reads out the word category model 5 from the storage device, and initializes it so that the word category estimation unit 4 can refer to it (step S11).

In response to a notification indicating the end of speech recognition processing, the speech recognition hypothesis input unit 2 acquires a speech recognition hypothesis from an external speech recognition apparatus and inputs it to the word category graph generation unit 3 (step S12).

The word category graph generation unit 3 generates a word category graph from the input speech recognition hypothesis and provides it to the word category estimation unit 4 (step S13).

In the word category estimation unit 4, the path search unit 41 traces the word category graph from the start to end along arcs. At the same time, the score computation unit 42 extracts the feature of each arc and obtains the score of the word category of this arc by referring to the word category model 5 (step S14).

After that, the path search unit 41 orders word category sequences (paths) based on a predetermined criterion on the word category graph, and outputs them from a highly ranked one as word category sequence candidates (step S15). Then, a series of word category estimation processes ends.

[Effects of First Exemplary Embodiment]

According to the first exemplary embodiment, the score of a word category corresponding to each arc of a word category graph is obtained together with the feature of a word associated with the arc and that of the entire word category graph. The first exemplary embodiment can increase the accuracy for searching for a word category sequence best matching an utterance. Especially for a section where a speech recognition error occurs, no satisfactory estimation accuracy is obtained in the conventional technique because the score of a word category is attained based on information having the recognition error. However, by using the feature of the whole utterance as information other than that of this section, the word category estimation accuracy of this section can be increased.

[Second Exemplary Embodiment]

A word category apparatus according to the second exemplary embodiment of the present invention will be explained in detail with reference to FIG. 8.

Figure 2:
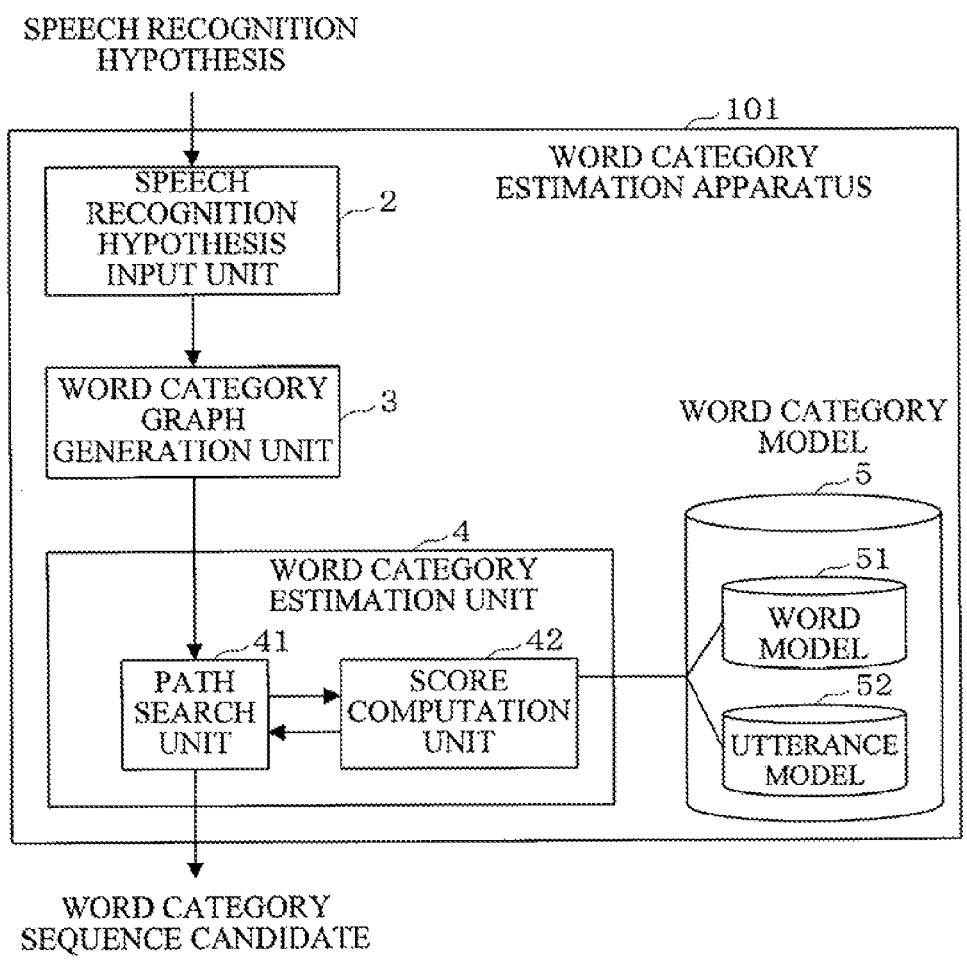
FIG. 2 is a block diagram showing the arrangement of the word category estimation apparatus according to the first exemplary embodiment of the present invention.

A word category estimation apparatus 102 according to the second exemplary embodiment is configured by adding an utterance pattern estimation unit 6 to the arrangement of the word category estimation apparatus 101 according to the first exemplary embodiment shown in FIG. 2.

The utterance pattern estimation unit 6 receives a speech recognition hypothesis output from a speech recognition hypothesis input unit 2, estimates the utterance pattern based on the speech recognition hypothesis, and provides the estimation result to a word category estimation unit 4. The utterance pattern is information characterized by the number and combination of word categories contained in an utterance. The utterance pattern is, for example, information indicating that the number of word categories contained in the utterance is one or that the utterance contains a "person name" and "program name". The utterance pattern can be estimated using a method of regularly classifying it based on words contained in a speech recognition hypothesis.

In the word category estimation unit 4, a model adjustment unit 43 receives the result from the utterance pattern estimation unit 6. The model adjustment unit 43 selects one of word category models 5 prepared in advance separately for respective utterance patterns, and computes the score. Similar to the first exemplary embodiment, the model adjustment unit 43 searches for a word category sequence (path) to be output. Instead of selecting one model, a plurality of models may be weighted. The use of a word category model suited to an utterance can increase the word category estimation accuracy. For example, if it is turned out that the number of word categories contained in an utterance is one, it can be prevented to erroneously estimate two or more word categories.

[Operation in Second Exemplary Embodiment]

Figure 9:
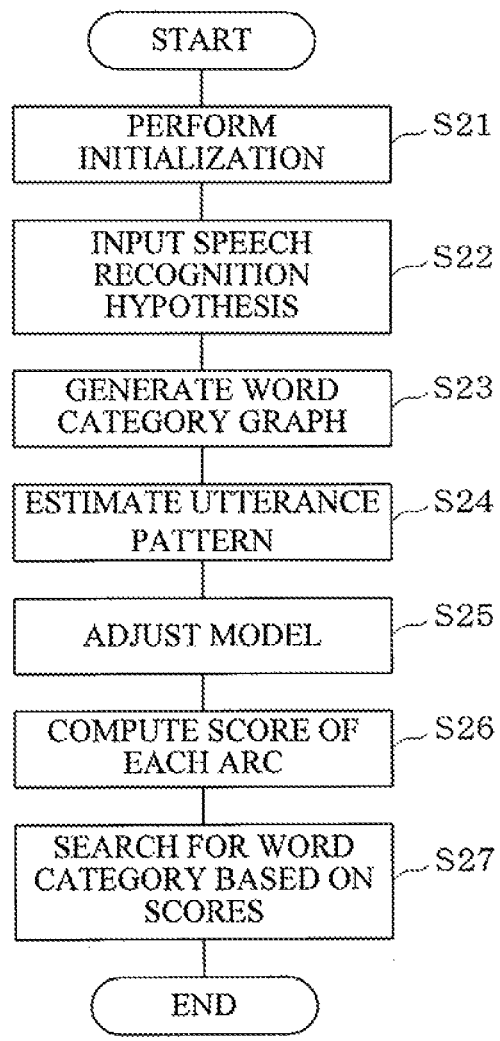
FIG. 9 is a flowchart showing word category estimation processing by the word category estimation apparatus according to the second exemplary embodiment of the present invention.

The operation of the word category estimation apparatus according to the second exemplary embodiment of the present invention will be explained with reference to FIG. 9.

Processes (steps S21, S22, and S23) up to generation of a word category graph by the word category graph generation unit 3 are the same as the procedures of steps S11, S12, and S13 in FIG. 7 explained for the word category estimation apparatus 101, and a detailed description thereof will not be repeated.

The utterance pattern estimation unit 6 estimates a word category pattern based on an input speech recognition hypothesis (step S24). By using the estimation result, the model adjustment unit 43 of the word category estimation unit 4 changes the weight of the word category model 5 to be referred to (step S25).

A path search unit 41 in the word category estimation unit 4 traces the word category graph from the start to end along arcs. At the same time, a score computation unit 42 extracts the feature of each arc and obtains the score of the word category of this arc by referring to the word category model 5 via the model adjustment unit 43 (step S26). The path search unit 41 orders word category sequences (paths) based on a predetermined criterion on the word category graph, and outputs them from a highly ranked one (step S27). Thereafter, a series of word category estimation processes ends.

[Effects of Second Exemplary Embodiment]

According to the second exemplary embodiment, the utterance pattern estimation unit 6 can determine a word category based on a rule, and estimate a word category based on a feature not contained in the word category model 5. Adding these kinds of information can increase the accuracy of the word category estimation unit 4 using the word category model 5.

[Third Exemplary Embodiment]

Figure 10:
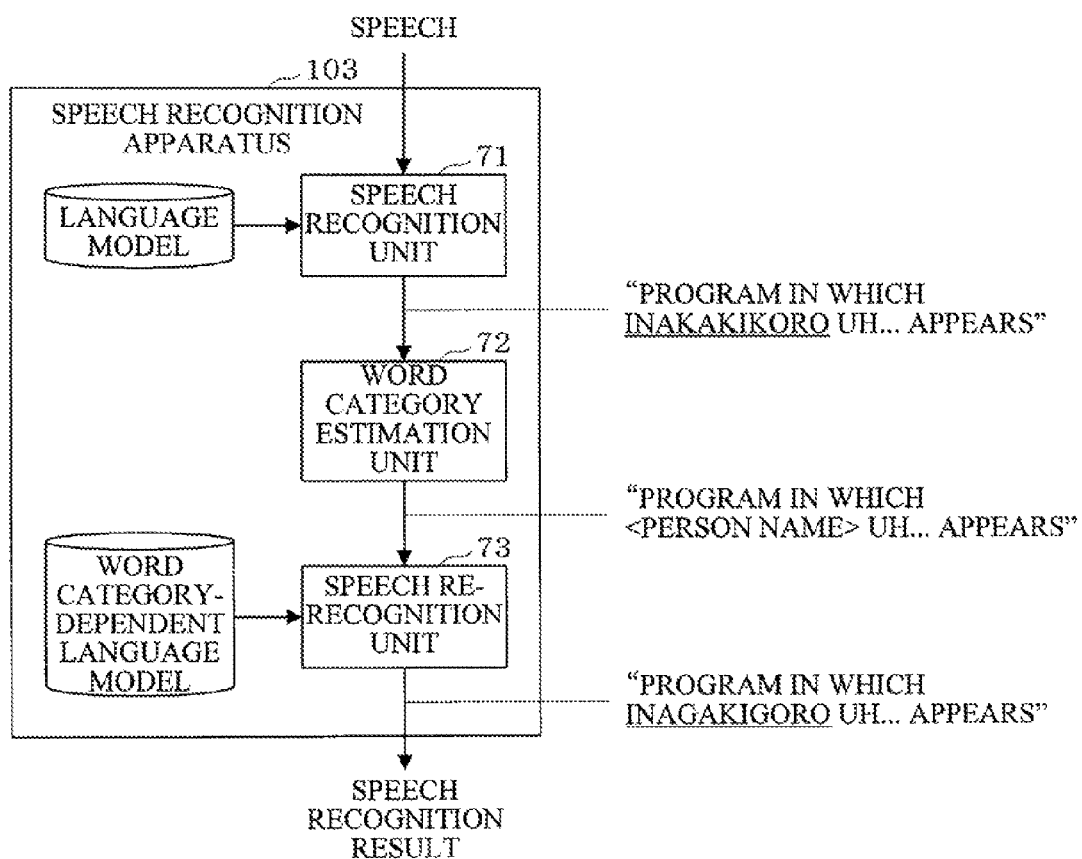
FIG. 10 is a block diagram showing the arrangement of a speech recognition apparatus according to the third exemplary embodiment of the present invention.
Figure 11:
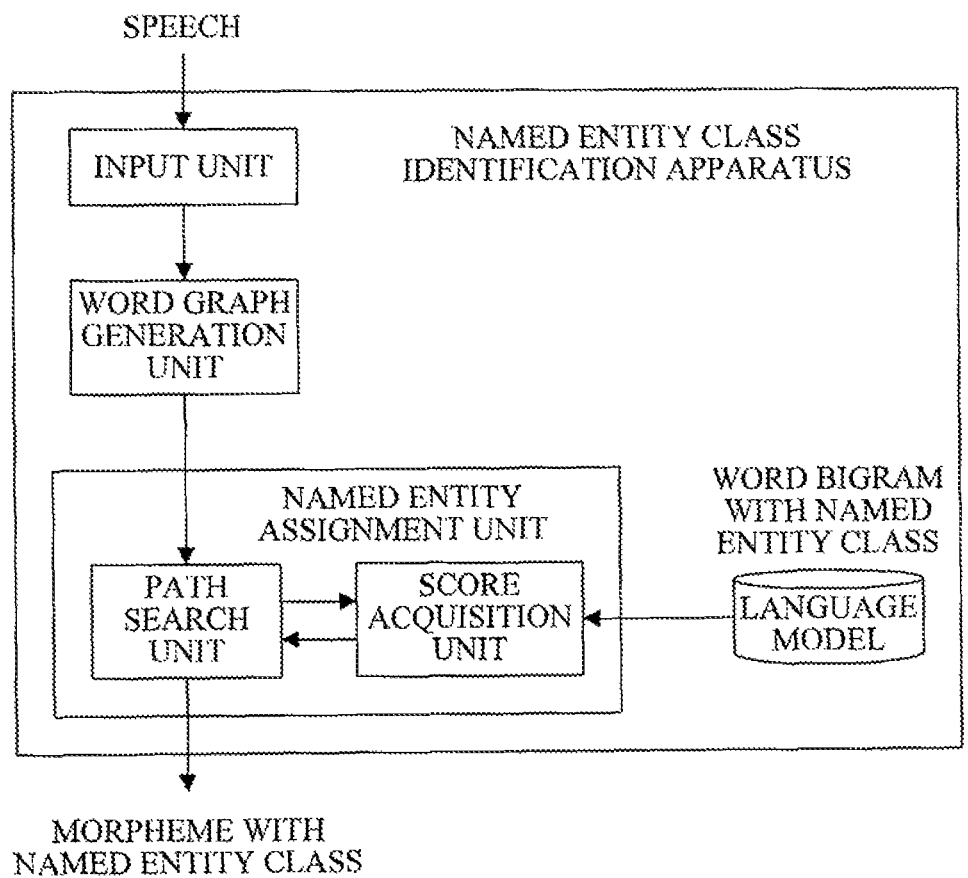
FIG. 11 is a block diagram showing the arrangement of a conventional class identification apparatus.

A speech recognition apparatus according to the third exemplary embodiment of the present invention will be described with reference to FIG. 10.

A speech recognition apparatus 103 according to the third exemplary embodiment is formed as a whole from an information processing apparatus such as a PC terminal or server apparatus in which a computer processes input data. The speech recognition apparatus 103 recognizes a word sequence contained in input speech and outputs the recognized word sequence. In particular, the speech recognition apparatus 103 adds word category information to a speech recognition result using the word category estimation apparatus 101 of the first exemplary embodiment (FIG. 2) or the word category estimation apparatus 102 of the second exemplary embodiment (FIG. 8). Based on the word category information, the speech recognition apparatus 103 executes speech recognition processing again.

The speech recognition apparatus 103 includes a speech recognition unit 71, word category estimation unit 72, and speech re-recognition unit 73 as main basic building components.

The speech recognition unit 71 performs speech recognition processing for speech input to the speech recognition apparatus 103, obtains a word sequence candidate corresponding to the speech, and outputs, for example, a word graph as a speech recognition hypothesis. The speech recognition unit 71 suffices to execute normal speech recognition processing to search for a word sequence matching the speech data in accordance with a score provided by a speech recognition model (including a language model, word dictionary, and acoustic model) for an utterance. For example, the trigram is employed as the language model, and the hidden Markov model is adopted as the acoustic model.

Figure 8:
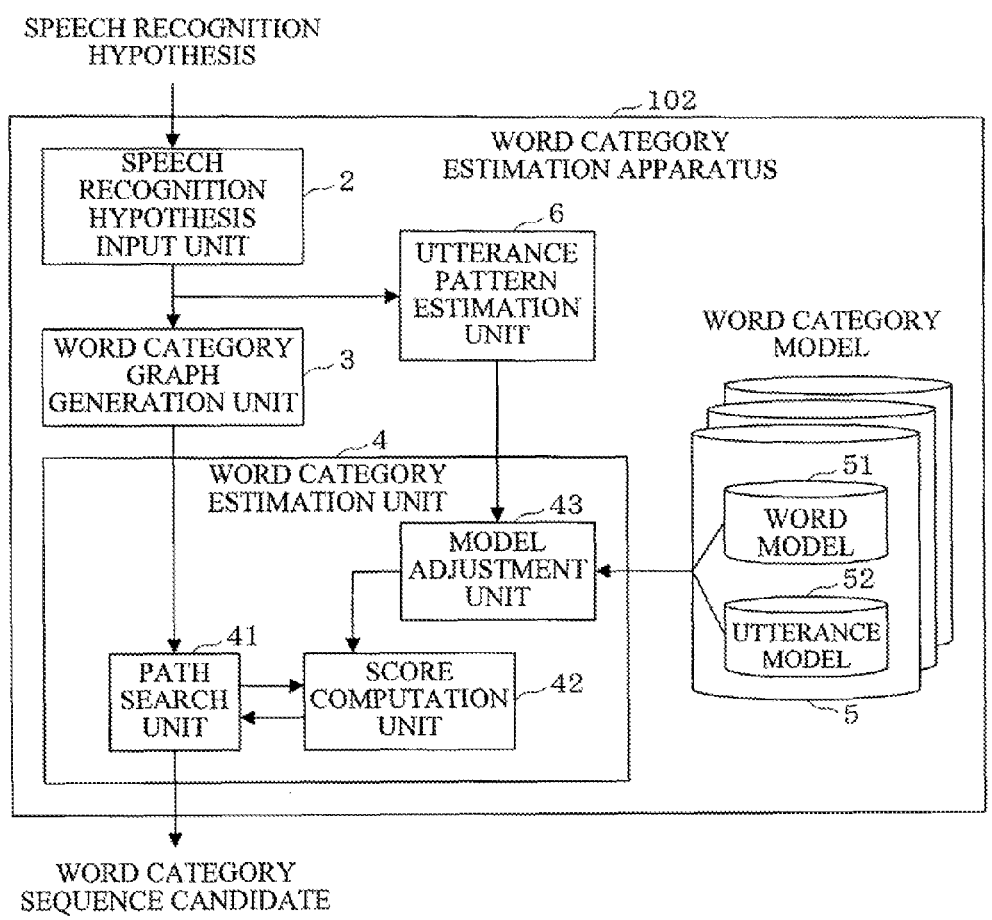
FIG. 8 is a block diagram showing the arrangement of a word category estimation apparatus according to the second exemplary embodiment of the present invention.

The word category estimation unit 72 is a processing unit equivalent to the word category estimation apparatus 101 in FIG. 2 or the word category estimation apparatus 102 in FIG. 8. The word category estimation unit 72 generates a word category graph from the word graph output from the speech recognition unit 71. Based on the word category model, the word category estimation unit 72 estimates the type and section (e.g., frame number) of the word category contained in the utterance, and outputs the estimation result.

By using the estimation result output from the word category estimation unit 72 as a language restriction, the speech re-recognition unit 73 limits the vocabulary in this section to words belonging to the estimated type of word category, and then performs speech recognition processing.

The operation of the speech recognition apparatus 103 will be explained using the example of FIG. 10.

The speech recognition unit 71 recognizes input speech and outputs, for example, a word sequence candidate "program in which inakakikoro uh . . . appears".

Then, the word category estimation unit 72 receives the speech recognition result at the first stage and estimates that "inaka", "kiko", and "ro" belong to the word category "person name". From the estimation result, the word category estimation unit 72 obtains a language restriction representing that the utterance section (e.g., frame number) corresponding to "inakakikoro" as part of the word sequence of the speech recognition hypothesis at the first stage belongs to "person name".

By using this language restriction, the speech re-recognition unit 73 performs speech recognition processing at the second stage. For example, recognition processing is done so that the speech recognition hypothesis includes only words belonging to the word category "person name" while excluding those belonging to other word categories for the utterance section (e.g., frame number) corresponding to the speech recognition result "inakakikoro" at the first stage.

[Effects of Third Exemplary Embodiment]

The third exemplary embodiment can increase the speech recognition accuracy by speech recognition processing considering a language restriction representing a word category to which a given section of an utterance belongs. Particularly, very high recognition accuracy can be obtained for a phrase belonging to a specific word category, such as a keyword input to an information retrieval apparatus.

The present invention has been described with reference to the exemplary embodiments, but the present invention is not limited to only the above-described arrangements. Various changes and modifications will readily occur to those skilled in the art within the scope of the invention.

Industrial Applicability

The word category estimation apparatus, word category estimation method, speech recognition apparatus, speech recognition method, and program according to the present invention are widely applicable to speech recognition techniques for converting speech into electronic data such as text data.

The invention claimed is:

1. A word category estimation apparatus comprising:
   a storage storing a word category model which includes a word model indicating relationships between features of arcs that form a word category graph and an occurrence frequency of a word category, and an utterance model indicating relationships between a feature of an entire word category graph and the occurrence frequency of the word category, relationships between features of the respective arcs and occurrence frequencies of corresponding word categories, and includes information indicating, as features of each of the arcs, relationships with respective arcs that form the word category graph; and
   a word category estimation unit implemented at least in hardware of the apparatus and which receives a word category graph of a speech recognition hypothesis to be processed, computes, by referring to said word category model, scores representing occurrence frequencies of word categories corresponding to the arcs and the features of said word category model of the arcs that form the words category graph and of the entire word category graph, and outputs a word category sequence candidate based on the scores,
   wherein the feature of the entire word category graph includes a number of arcs of the entire word category graph, and an average number of branches of arcs of the entire word category graph,
   wherein the feature of the arcs that form the word category graph includes position information in the entire word category graph.

2. A word category estimation apparatus according to claim 1, further comprising an utterance pattern estimation unit which estimates an utterance pattern concerning the speech recognition hypothesis by regularly classifying the utterance pattern based on words contained in the speech recognition hypothesis,
   wherein said word category estimation unit computes the scores by referring to a word category model corresponding to the utterance pattern estimated by said utterance pattern estimation unit.

3. A word category estimation apparatus according to claim 2, wherein said word category estimation unit computes the scores based on weights assigned in advance to respective word category models by referring to the respective word category models corresponding to a plurality of utterance patterns estimated by said utterance pattern estimation unit.

4. A word category estimation method comprising:
   a step of storing, in a storage unit, a word category model which includes a word model indicating relationships between features of arcs that form a word category graph and an occurrence frequency of a word category, and an utterance model indicating relationships between a feature of an entire word category graph and the occurrence frequency of the word category, relationships between features of the respective arcs and occurrence frequencies of corresponding word categories, and includes information indicating, as the features of the respective arcs, relationships with respective arcs that form the word category graph; and a word category estimation step of causing an arithmetic processing unit to receive a word category graph of a speech recognition hypothesis to be processed, computes, by referring to said word category model, scores representing occurrence frequencies of word categories corresponding to the arcs and the features of said word category model of the arcs that form the words category graph and of the entire word category graph, and outputs a word category sequence candidate based on the scores, wherein the feature of the entire word category graph includes a number of arcs category graph, and an average number of branches arcs of the entire word category graph, wherein the feature of the arcs that form the word category graph includes position information in the entire word category graph.

5. A word category estimation method according to claim 4, further comprising the utterance pattern estimation step of causing the arithmetic processing unit to estimate an utterance pattern concerning the speech recognition hypothesis by regularly classifying the utterance pattern based on words contained in the speech recognition hypothesis, wherein the word category estimation step includes the step of computing the scores by referring to a word category model corresponding to the utterance pattern estimated in the utterance pattern estimation step.

6. A word category estimation method according to claim 5, wherein the word category estimation step includes the step of computing the scores based on weights assigned in advance to respective word category models by referring to the respective word category models corresponding to a plurality of utterance patterns estimated in the utterance pattern estimation step.

7. A non-transitory machine-readable storage medium storing a program that when executed by a computer including the non-transitory machine-readable storage medium and an arithmetic processing unit, causes the computer to perform, the program comprising:

a step of storing, in the non-transitory machine readable storage medium, a word category model which includes a word model indicating relationships between features of arcs that form a word category graph and an occurrence frequency of a word category, and an utterance model indicating relationships between a feature of an entire word category graph and the occurrence frequency of the word category, relationships between features of the respective arcs and occurrence frequencies of corresponding word categories, and includes information indicating, as features of each of the arcs, relationships with respective arcs that form the word category graph, and a word category estimation step of causing the arithmetic processing unit to receive a word category graph of a speech recognition hypothesis to be processed, computes, by referring to said word category model, scores representing occurrence frequencies of word categories corresponding to the arcs and the features of said word category model of the arcs that form the words category graph and of the entire word category graph, and outputs a word category sequence candidate based on the scores, wherein the feature of the entire word category graph includes a number of arcs of the entire word category graph, and an average number of branches of arcs of the entire word category graph, wherein the feature of the arcs that form the word category graph includes position information in the entire word category graph.

8. A non-transitory machine-readable storage medium according to claim 7, the program further comprising the step of causing the arithmetic processing unit to estimate an utterance pattern concerning the speech recognition hypothesis by regularly classifying the utterance pattern based on words contained in the speech recognition hypothesis, wherein the word category estimation step includes the step of computing the scores by referring to a word category model corresponding to the utterance pattern estimated in the utterance pattern estimation step.

9. A non-transitory machine-readable storage medium according to claim 8, wherein the word category estimation step includes the step of computing the scores based on weights assigned in advance to respective word category models by referring to the respective word category models corresponding to a plurality of utterance patterns estimated in the utterance pattern estimation step.

10. A speech recognition apparatus comprising:

a speech recognition unit implemented at least by hardware of the apparatus and which generates a speech recognition hypothesis corresponding to input speech;

a storage storing a word category model which includes a word model indicating relationships between features of arcs that form a word category graph and an occurrence frequency of a word category, and an utterance model indicating relationships between a feature of an entire word category graph and the occurrence frequency of the word category, relationships between features of the respective arcs and occurrence frequencies of corresponding word categories, and includes information indicating, as features of each of the arcs, relationships with respective arcs that form the word category graph;

a word category estimation unit implemented at least in hardware of the apparatus and which receives a word category graph of a speech recognition hypothesis to be processed, computes, by referring to said word category model, scores representing occurrence frequencies of word categories corresponding to the arcs and the features of said word category model of the arcs that form the words category graph and of the entire word category graph, and estimates a word category sequence candidate based on the scores, a speech re-recognition unit implemented at least by the hardware of the apparatus and which performs speech recognition again using a result of the word category estimation as a vocabulary restriction, wherein the feature of the entire word category graph includes a number of arcs of the entire word category graph and an average number of branches of arcs of the entire word category graph, wherein the feature of the arcs that form the word category graph includes position information in the entire word category graph.

11. A speech recognition method comprising:

a speech recognition step of causing an arithmetic processing unit to generate a speech recognition hypothesis corresponding to input speech;

a step of storing, in a storage unit, a word category model which includes a word model indicating relationships between features of arcs that form a word category graph and an occurrence frequency of a word category, and an utterance model indicating relationships between a feature of an entire word category graph and the occurrence frequency of the word category, relationships between features of the respective arcs and occurrence frequencies of corresponding word categories, and includes information indicating, as features of each of the arcs, relationships with respective arcs that form the word category graph;

a word category estimation step of causing the arithmetic processing unit to receive a word category graph of a speech recognition hypothesis to be processed, computes, by referring to said word category model, scores representing occurrence frequencies of word categories corresponding to the arcs and the features of said word category model of the arcs that form the words category graph and of the entire word category graph, and estimates a word category sequence candidate based on the scores, and the speech re-recognition step of causing the arithmetic processing unit to perform speech recognition again using a result of the word category estimation as a vocabulary restriction, wherein the feature of the entire word category graph includes a number of arcs of the entire word category graph, and an average number of branches of arcs of the entire word category graph, wherein the feature of the arcs that form the word category graph includes position information in the entire word category graph.

12. A non-transitory machine-readable storage medium storing a program that when executed by a computer including the non-transitory machine-readable storage medium and an arithmetic processing unit, causes the computer to perform, the program comprising:

a speech recognition step of causing the arithmetic processing unit to generate a speech recognition hypothesis corresponding to input speech;

a step of storing, in the non-transitory machine readable storage medium, a word category model which includes a word model indicating relationships between features of arcs that form a word category graph and an occurrence frequency of a word category, and an utterance model indicating relationships between a feature of an entire word category graph and the occurrence frequency of the word category, relationships between features of the respective arcs and occurrence frequencies of corresponding word categories, and includes information indicating, as features of each of the arcs, relationships with respective arcs that form the word category graph;

a word category estimation step of causing the arithmetic processing unit to receive a word category graph of a speech recognition hypothesis to be processed, computes, by referring to said word category model, scores representing occurrence frequencies of word categories corresponding to the arcs and the features of said word category model of the arcs that form the words category graph and of the entire word category graph, and estimates a word category sequence candidate based on the scores, and the speech re-recognition step of causing the arithmetic processing unit to perform speech recognition again using a result of the word category estimation as a vocabulary restriction, wherein the feature of the entire word category graph includes a number of arcs of the entire word category graph, and an average number of branches of arcs of the entire word category graph, wherein the feature of the arcs that form the word category graph includes position information in the entire word category graph.

* * * * *